United States Patent [19]

Legatt et al.

[11] Patent Number: 5,607,178
[45] Date of Patent: Mar. 4, 1997

[54] REAR WHEEL ISOLATION SUSPENSION FOR FLOOR SCRUBBERS

[75] Inventors: Donald J. Legatt; Jerome A. Gunn, both of St. Michael, Minn.

[73] Assignee: Advance Machine Company, Plymouth, Minn.

[21] Appl. No.: 403,373

[22] Filed: Mar. 15, 1995

[51] Int. Cl.$^6$ .............................. B60G 9/02; B60G 11/22; A47L 11/28; A47L 11/30
[52] U.S. Cl. .......................... 280/716; 15/320; 15/340.1; 267/257; 267/292
[58] Field of Search .................................... 280/716, 717, 280/688, 671, 725, 713, 11.28, 87.03, 283; 267/257, 258, 292, 293; 15/320, 340.1, 340.3, 340.4, 50.1

[56] References Cited

U.S. PATENT DOCUMENTS

| | | |
|---|---|---|
| 1,935,202 | 11/1933 | Chamberlain et al. . |
| 2,025,858 | 12/1935 | Harris ................................. 280/11.28 |
| 2,095,466 | 10/1937 | Cummings ............................... 15/326 |
| 2,125,850 | 8/1938 | Norris .................................... 15/326 |
| 2,132,840 | 10/1938 | Workman et al. ...................... 267/293 |
| 2,253,310 | 8/1941 | Smellie ................................... 15/326 |
| 3,128,985 | 4/1964 | Wallerstein, Jr. . |
| 3,147,964 | 9/1964 | Wolf ...................................... 267/292 |
| 3,409,284 | 11/1968 | Rix . |
| 3,412,990 | 11/1968 | Gladstone . |
| 3,575,288 | 4/1971 | Brucken ................................. 248/615 |
| 3,609,787 | 10/1971 | Aurelio et al. ....................... 15/320 X |
| 3,721,417 | 3/1973 | Skala et al. . |
| 3,803,666 | 4/1974 | Sawyer .................................... 15/320 |
| 3,918,738 | 11/1975 | Raidel .................................... 280/668 |
| 4,000,536 | 1/1977 | Nayfa et al. ............................ 15/50 A |
| 4,006,506 | 2/1977 | Burgoon ................................ 15/320 X |
| 4,369,540 | 1/1983 | Burgoon et al. ....................... 15/340.3 |
| 4,380,844 | 4/1983 | Waldhauser et al. ...................... 15/320 |
| 4,538,697 | 9/1985 | Muroi et al. . |
| 4,713,714 | 12/1987 | Gatti et al. ........................... 248/638 X |
| 4,718,631 | 1/1988 | Reynolds et al. ....................... 248/615 |
| 4,720,075 | 1/1988 | Peterson et al. . |
| 4,744,539 | 5/1988 | Stimeling ............................... 248/638 |
| 4,754,827 | 7/1988 | Hirabayashi . |
| 4,803,753 | 2/1989 | Palmer ................................. 15/320 X |
| 4,805,256 | 2/1989 | Mason et al. ............................. 15/320 |
| 4,854,005 | 8/1989 | Wiese et al. ............................. 15/320 |
| 4,871,142 | 10/1989 | deMey, II .............................. 248/632 |
| 5,040,953 | 8/1991 | Tinsler .................................. 417/363 |
| 5,054,158 | 10/1991 | Williams et al. ...................... 15/340.1 |
| 5,098,506 | 3/1992 | Brown et al. ............................ 15/50.1 |
| 5,114,178 | 5/1992 | Baxter ................................... 280/716 |
| 5,118,131 | 6/1992 | Manning ................................ 280/725 |
| 5,251,865 | 10/1993 | Kelly ..................................... 267/292 |
| 5,297,769 | 3/1994 | Le Fol et al. . |
| 5,369,838 | 12/1994 | Wood et al. ............................. 15/320 |

FOREIGN PATENT DOCUMENTS

| | | | |
|---|---|---|---|
| 1354286 | 1/1964 | France ................................... 267/292 |
| 1150403 | 1/1957 | Germany ................................ 280/688 |

Primary Examiner—Brian L. Johnson
Assistant Examiner—Peter C. English
Attorney, Agent, or Firm—Peterson Wicks Nemer & Kamrath, P.A.

[57] ABSTRACT

A floor scrubber is disclosed including a frame including a drive wheel, rear wheels, brushes, vacuum squeegee system, batteries, solution tanks, and an operator seat. The rear wheels are rotatably mounted on the opposite ends of a steel rod. Arms are attached rigidly to the axle and each include a cylindrical pivot in which an elastomer bushing is press fit. Pivot pins extend through first and second pairs of first and second plates and the elastomer bushing for pivotably mounting the arms to the frame while isolating any transmitted vibrations. Elastomeric isolator mounts are provided each including a frusto-conical shaped body and each having a nut embedded in the lower end for threadable receipt of a bolt passing through an attachment plate attached to the axle. The upper ends of the elastomeric isolator mounts each include a plate secured thereto and secured to the frame.

9 Claims, 2 Drawing Sheets

5,607,178

REAR WHEEL ISOLATION SUSPENSION FOR FLOOR SCRUBBERS

BACKGROUND

The present invention generally relates to equipment for the floor-care industry, particularly to floor scrubbers, more particularly to floor scrubbers that the operator can ride upon, and specifically to floor scrubbers including unique provisions for dampening the vibrations caused by the machine moving over a rough surface.

A floor scrubber is a commonly used piece of equipment in the floor-care industry. The machine is generally comprised of a tank to hold cleaning solution, a scrub system to agitate the solution on the floor surface in order to loosen dirt, a vacuum squeegee system to pick up the dirty solution, and a tank to contain the dirty solution. The larger floor scrubbers are usually equipped with a traction drive system to propel the machine across the floor. Typically, to eliminate the requirement for extension chords and as floor scrubbers are typically utilized indoors such that air quality must not be compromised, floor scrubbers are often battery powered.

In use, the floor scrubber is used to scrub aisles, hallways, and the like, and to scrub close to objects. Therefore, the floor scrubber is used on a variety of floors, such as smooth tile or concrete, ceramic tile, or rough concrete, so it is advantageous both from the standpoint of operator and machine, as well as the floor itself, to provide a means of dampening the vibrations caused by the machine moving over a rough surface. Current means for providing dampening in floor scrubbers has been utilizing cushion tires. However, cushion tires have a lower load rating than a noncushion tire for a given size, so the tire size must be substantially increased. This necessitates a less compact machine, causing potential maneuvering difficulties. Alternately, spring caster wheels, which provide a degree of suspension, have been utilized for dampening in floor scrubbers. These spring casters, however, are very expensive, and in many cases are not economically feasible.

U.S. Pat. No. 5,369,838 discloses elastomeric isolator mounts between a truck section of its frame and its upper assembly. Such mounts have been highly effective in dampening the vibrations caused by the floor scrubber moving over a rough surface.

However, a need continues to exist for improved methods of providing dampening of the vibrations caused by floor-care equipment moving over rough surfaces.

SUMMARY

The present invention solves these needs and other problems in the field of floor care by providing, in the most preferred form, the free end of an arm rigidly attached to and extending from an axle of a floor cleaning machine pivotably mounted to the frame about a pivot axis parallel to but spaced from the axle and isolating any transmitted vibrations from the wheels and the axle to the frame through the pivot axis, with the axle resiliently attached to the frame for restricting the pivotal movement of the arm relative to the frame and for isolating any transmitted vibration from the wheels and the axle to the frame through the resiliently attaching means.

It is thus an object of the present invention to provide a novel floor cleaning machine where the rear wheels or like structure for movably supporting the machine on the floor are isolated from the frame of the machine by a multiplicity of elastomeric isolator mounts and bushings.

It is further an object of the present invention to provide such a novel floor cleaning machine having elastomeric isolator suspension which attaches the rear axle and frame together.

It is further an object of the present invention to provide such a novel floor cleaning machine extending the life of components and especially the batteries.

It is further an object of the present invention to provide such a novel floor cleaning machine having a high level of operator comfort.

It is further an object of the present invention to provide such a novel floor cleaning machine having reduced chance of floor surface damage.

It is further an object of the present invention to provide such a novel floor cleaning machine dampening vibration forces.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
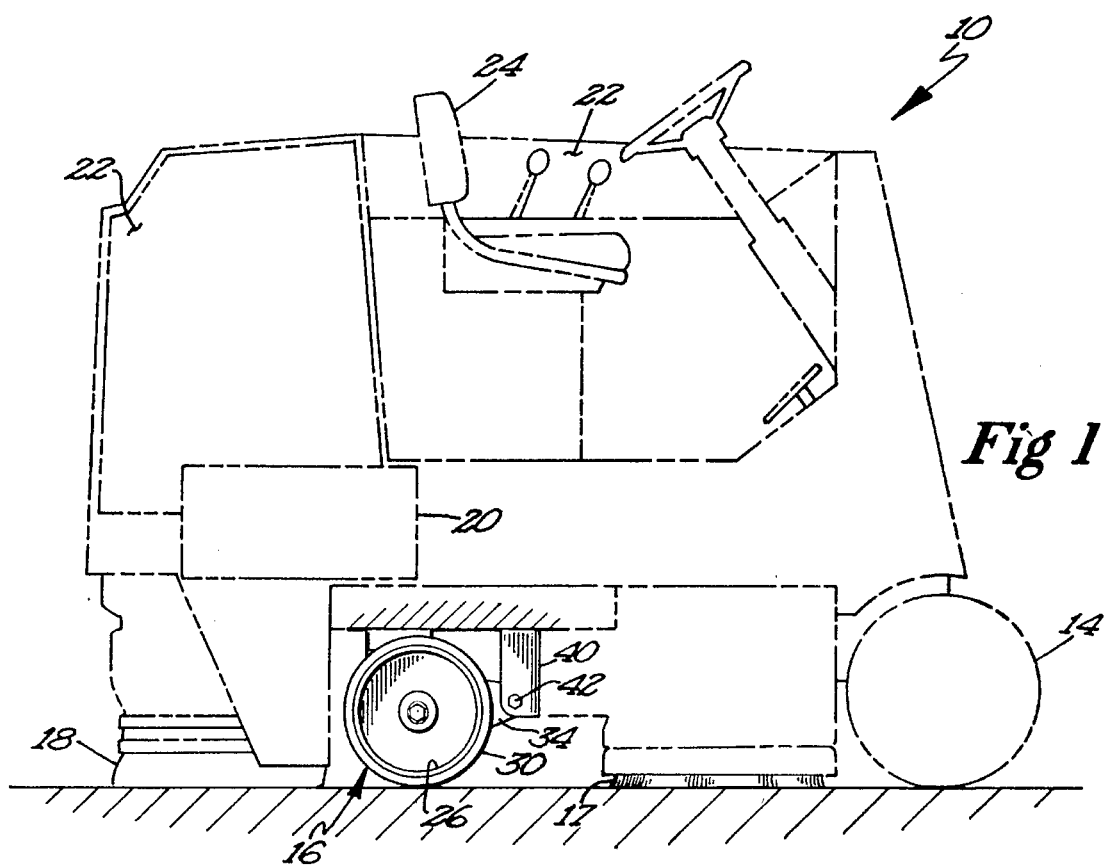
FIG. 1 shows a side-elevational view of a floor scrubber according to the preferred teachings of the present invention, with portions shown in phantom.
Figure 3:
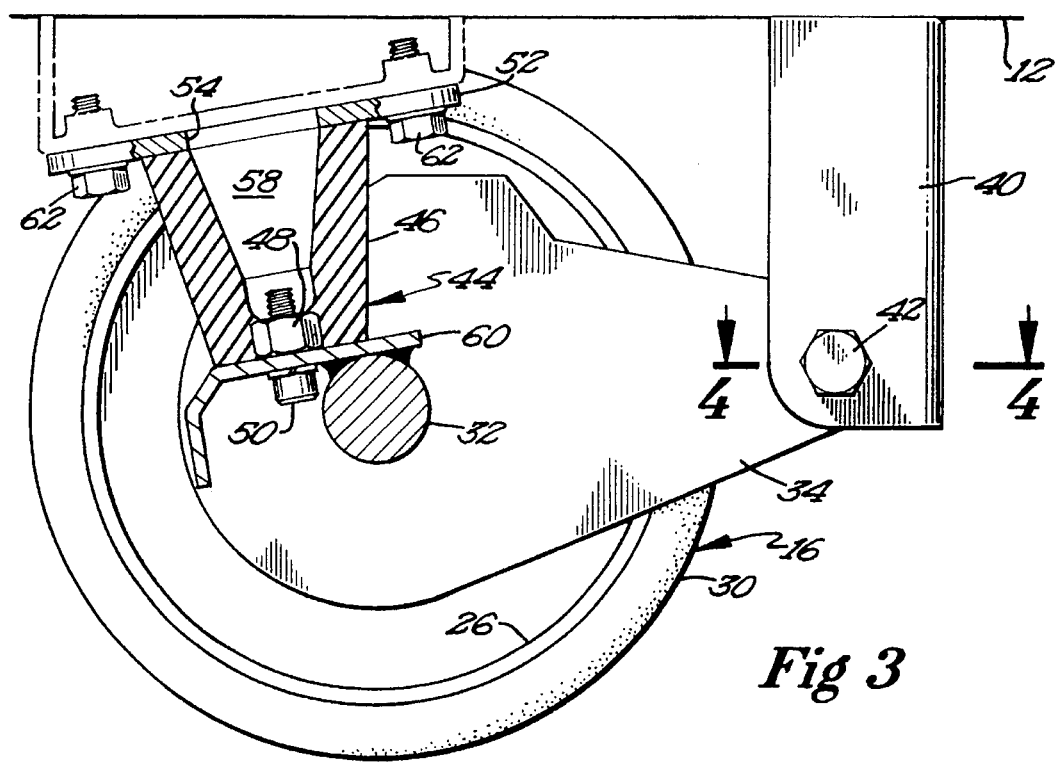
FIG. 3 shows a cross-sectional view of the floor scrubber of FIG. 1.
Figure 2:
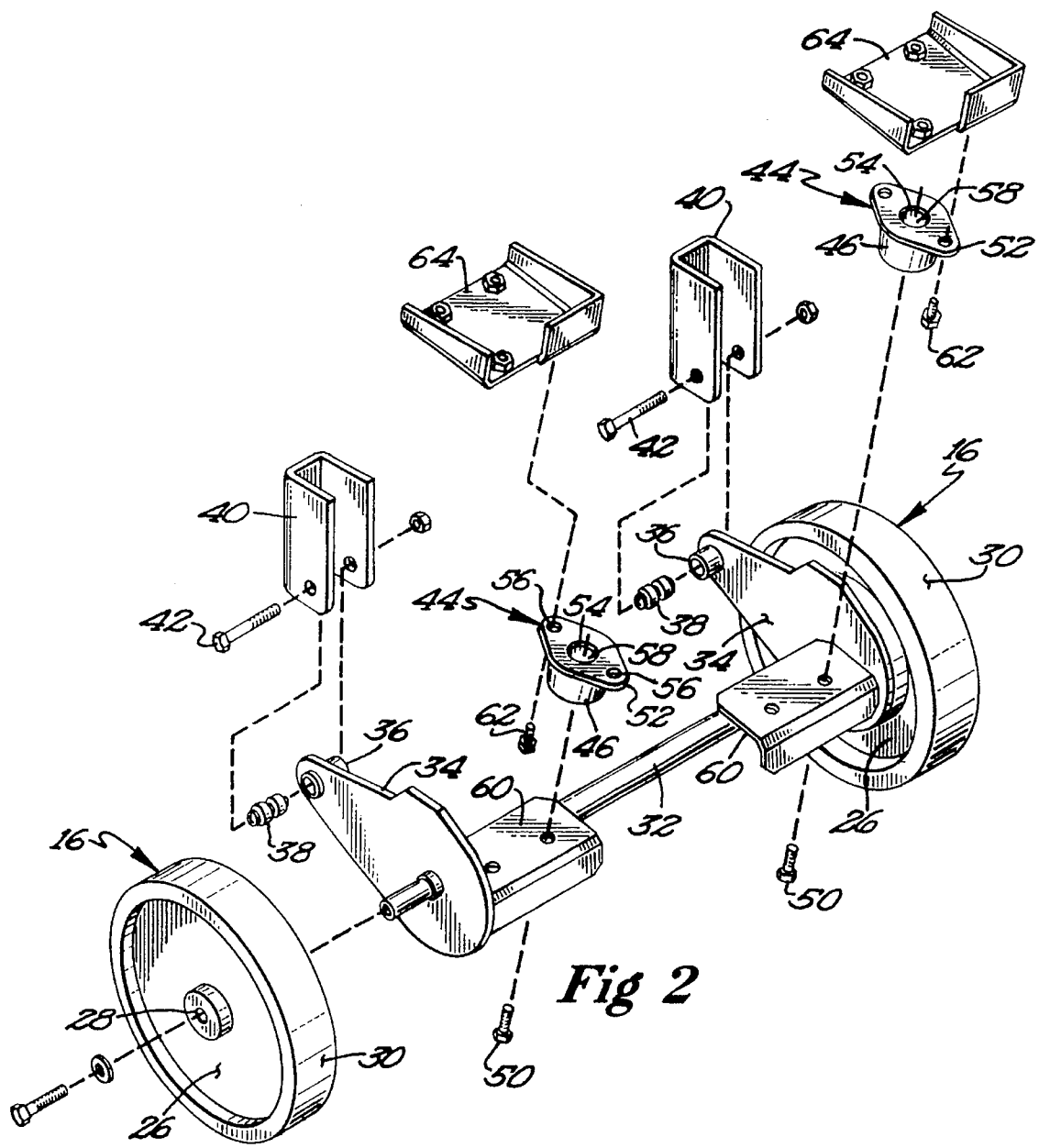
FIG. 2 shows an exploded perspective view of the floor scrubber of FIG. 1.
Figure 4:
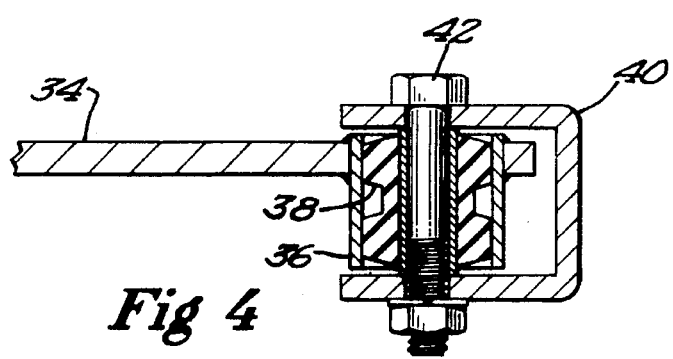
FIG. 4 shows a cross-sectional view of the floor scrubber of FIG. 1 according to section line 4—4 of FIG. 3.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "outer", "inner", "upper", "lower", "height", "width", "end", "side", "horizontal", "vertical", "longitudinal" and similar terms are used herein, it should be understood that these terms have reference only to the structure shown in the drawings as it would appear to a person viewing the drawings and are utilized only to facilitate describing the illustrative embodiment.

DESCRIPTION

A floor scrubber according to the preferred teachings of the present invention is shown in the drawings and generally designated 10. In the most preferred form, scrubber 10 is of the type that the operator rides upon. Generally, scrubber 10 includes in the preferred form a frame 12 to which are attached a drive wheel 14, first and second rear wheels 16, rotatable scrubbing brushes 17 for agitating cleaning solution on the floor surface in order to loosen dirt, vacuum squeegee system 18, batteries 20, tanks 22 for holding a supply of cleaning solution and for containing dirty solution removed from the floor, and a seat 24 for supporting the operator.

According to the teachings of the present invention, wheels 16 are relatively rigid rather than resilient to minimize machine rolling resistance. In the most preferred form, wheels 16 include a rim 26 having an axial opening 28 formed in the most preferred form by first and second ball bearings pressed into rim 26. The outer periphery of rim 26 includes a tread 30 formed in the most preferred form by urethane having a hardness in the range of 90 shore D durometer.

Wheels 16 are rotatably mounted on the opposite ends of an axle 32 in the form of a steel rod. Extending forward from axle 32 just axially inboard of each wheel 16 are first and second arms 34 attached rigidly and generally perpendicular to axle 32. At the front of each arm 34 is a cylindrical pivot 36 having an axis spaced from and parallel to axle 32. A cylindrical elastomer bushing 38 is press fit in each of pivots 36. In the most preferred form, pivots 36 and bushings 38 have circular cross sections. In the most preferred form, frame 12 includes first and second pairs of first and second, vertically arranged plates 40. First and second pivot pins 42 extend through apertures formed in plates 40 and through bushing 38 and are positioned spaced from and parallel to axle 32. In the most preferred form, bushings 38 have an axial length generally equal to pivots 36 and the horizontal spacing between first and second plates 40. It can then be appreciated that the connection of arms 34 to frame 12 according to the preferred teachings of the present invention allows axle 32 to pivot about pivot pins 42 yet isolates any transmitted vibrations because of the dampening characteristics of the elastomeric material forming bushings 38.

In the preferred form of the present invention, frame 12 and axle 32 are resiliently attached together but isolated from each other at a location spaced from pivot pins 42 in the most preferred form by a multiplicity of elastomeric isolator mounts 44. Each mount 44 includes an elastomeric body 46 of a generally frusto-conical shape and having a first, upper end and a second, lower end. A nut 48 is embedded in body 46 at the second lower end for threadably receiving a bolt 50 along the axis of the frusto-conical shape of body 46. A plate 52 is secured or embedded in body 46 at the first, upper end of body 46. Plate 52 and body 46 include an aperture 54 arranged concentric to the axis of the frusto-conical shape of body 46. Plate 52 and body 46 further include first and second bores 56 arranged spaced from, parallel to, and on opposite sides of the frusto-conical shape of body 46. Body 46 further includes a frusto-conical passage 58 extending concentrically inside the frusto-conical shape of body 46 between nut 48 and aperture 54.

First and second attachment plates 60 are rigidly attached to and extend tangentially from axle 32. Bolts 50 extend through apertures formed in attachment plates 60 and are threaded into nuts 48 of mounts 44. Bolts 62 extend though bores 56 of mounts 44 and are threadably received in a bracket 64 of frame 12. In the most preferred form, bolts 50 and 62 and the axis of the frusto-conical shape of body 46 of mounts 44 are mounted at a small acute angle from vertical in the range of 10°.

In order to obtain adequate run time for scrubber 10 without requiring an overly large battery 20, the efficiency of all electrical motors must be high and current requirements must be controlled within acceptable limits. Specifically, concerning the traction drive motor for drive wheel 14, the rolling resistance of scrubber 10 must be minimized so current draw in turn would be minimized. Wheels 16 according to the preferred teachings of the present invention minimizes rolling resistance. However, wheels 16, being rigid, rather than resilient, do not dampen out any vibrations as scrubber 10 travels over the floor surface as would cushion tires. Without the present invention, scrubber 10 utilizing wheels 16 would have an uncomfortable and unacceptable ride for the operator, would reduce the life of components and especially batteries 20 of scrubber 10, and would likely cause damage to the floor surface as well, especially if the surface is comprised of grouted ceramic tile. However, these problems are overcome by the present invention since the transmitted vibrations from the rear axle component of scrubber 10 are isolated from frame 12 by elastomer bushings 38 which pivotably mount the free ends of arms 34 to frame 12 about a pivot axis parallel to but spaced from axle 32 and by mounts 44 which resiliently attach axle 32 to frame 12 for restricting the pivotal movement of arms 34 relative to frame 12. In the most preferred form, pivot pins 42 are carried by frame 12 and extend through bushing 38 without direct physical contact with arms 34.

Thus, scrubber 10 according to the teachings of the present invention obtains several advantages. First, as shock loading has been greatly reduced, extended component life is obtained. This is especially important when floor scrubber 10 is powered by batteries 20 as vibration of batteries 20 can cause electrical plate damage and significant shorter life. Also, as the operator is supported by frame 12 on seat 24 and isolated from vibrations of axle 32 and wheels 16 rotatably mounted thereon, a higher level of operator comfort is obtained. Additionally, as batteries 20 and the solution in tanks 22 which comprise the heaviest components of floor scrubber 10 are isolated from wheels 16 which movably support scrubber 10 upon the floor surface, there is less chance of damage to the floor surface.

It should further be noted that elastomeric isolator mounts 44 for dampening vibrations do not encounter many problems encountered by springs in resilient support systems. Specifically, spring constants vary between springs and during the life of the spring. Thus, accurate and consistent performance of spring supports are expensive and difficult to obtain and maintain over the life of the machine, and often require spring replacement during the life of the machine. Also, springs generally act through compression to prevent two objects from moving together but generally do not prevent objects from moving apart, with rigid stops being provided to prevent separation beyond a maximum amount. Thus, spring supports do not tend to dampen forces which cause separation. Additionally, direct metal-to-metal contact is made by the bolt to the flanges which slideably receive the bolt holding the spring and indirect metal-to-metal contact is further made through the spring itself, with such metal-to-metal contact transmitting vibrations. However, according to the teachings of the present invention, mounts 44 are relatively easy and inexpensive to manufacture and maintain their dampening characteristics over the life of the machine and act whether the forces tend to move frame 12 and the rear axle component together or apart without direct or indirect metal-to-metal contact.

In the most preferred form, a suitable braking device, not shown, of any conventional type can be provided in the rear axle component for braking scrubber 10.

Now that the basic teachings of the present invention have been explained, many extensions and variations will be obvious to one skilled in the art. For example, mounts 44 can be inverted according to the teachings of the present invention. Likewise, other types and forms of elastomeric isolator bushings 38 and mounts 44 can be utilized according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Machine for cleaning floors comprising, in combination: a frame; means attached to the frame for cleaning floors; an axle in the form of a rod and having first and second ends; first and second relatively rigid wheels each having an axial opening, with the axial openings of the first and second wheels being directly rotatably mounted on the axle adjacent the first and second ends; at least a first arm rigidly and directly attached to and extending from the axle, with the first arm including a free end; means for pivotably mounting the free end of the arm to the frame about a pivot axis parallel to but spaced from the axle and for isolating any transmitted vibrations from the wheels and the axle to the frame through the pivot axis; means for resiliently attaching the axle to the frame for restricting the pivotal movement of the arm relative to the frame and for isolating any transmitted vibration from the wheels and the axle to the frame through the resiliently attaching means; and a drive wheel attached to the frame spaced from the axle.

2. The floor cleaning machine of claim 1 wherein the pivotably mounting means comprises, in combination: a cylindrical pivot in the arm having an axis spaced from and parallel to the axle; an elastomer bushing press fit in the cylindrical pivot; first and second plates having apertures formed therein, with the elastomer bushing having an axial length generally equal to the spacing between the first and second plates; and a pivot pin extending through the apertures formed in the plates and through the elastomer bushing without direct physical contact with the arm, with the first and second plates being carried by the frame.

3. The floor cleaning machine of claim 2 wherein the resiliently attaching means comprises an elastomeric isolator mount having a first end and a second end, with the axle attached to one of the first and second ends of the elastomeric isolator mount and the frame attached to the other of the first and second ends of the elastomeric isolator mount.

4. The floor cleaning machine of claim 3 further comprising, in combination: an attachment plate rigidly and directly attached to and extending tangentially from the axle, with the first end of the elastomeric isolator mount being attached to the attachment plate.

5. The floor cleaning machine of claim 4 wherein the elastomeric isolator mount has a body of a generally frusto-conical shape and having the first and second ends, with a nut embedded in the body at the second end for threadably receiving a bolt along the axis of the frusto-conical shape of the body, with a plate secured to the body at the first end, with the plate including an aperture arranged concentric to the axis of the frusto-conical shape, with the body including a frusto-conical passage extending concentrically inside the frusto-conical shape of the body between the nut and the aperture.

6. The floor cleaning machine of claim 5 wherein the axis of the frusto-conical shape of the body is at a small acute angle from vertical in the range of 10°.

7. The floor cleaning machine of claim 1 wherein the resiliently attaching means comprises an elastomeric isolator mount having a first end and a second end, with the axle attached to one of the first and second ends of the elastomeric isolator mount and the frame attached to the other of the first and second ends of the elastomeric isolator mount.

8. The floor cleaning machine of claim 7 further comprising, in combination: tanks for holding a supply of cleaning solution and for containing dirty solution removed from the floor; and a vacuum squeegee system, with the tanks and vacuum squeegee system attached to the frame.

9. The floor cleaning machine of claim 8 further comprising, in combination: batteries attached to the frame for powering the floor cleaning machine.

* * * * *